United States Patent
Thambidurai et al.

(10) Patent No.: US 7,209,931 B2
(45) Date of Patent: Apr. 24, 2007

(54) USER MATRICULATION STATUS DETERMINATION VIA A COMPUTER NETWORK

(75) Inventors: Sunil Thambidurai, New York, NY (US); Tore Christiansen, Bekkestua (NO); Espen Odegard, Brookline, MA (US)

(73) Assignee: Studentuniverse.com, Watertown, MA (US)

( * ) Notice: Subject to any disclaimer, the term of this patent is extended or adjusted under 35 U.S.C. 154(b) by 457 days.

(21) Appl. No.: 10/161,114

(22) Filed: May 31, 2002

(65) Prior Publication Data

US 2003/0212790 A1    Nov. 13, 2003

Related U.S. Application Data

(60) Provisional application No. 60/379,485, filed on May 10, 2002.

(51) Int. Cl.
G06F 7/00 (2006.01)

(52) U.S. Cl. .................. 707/104.1; 705/14; 705/26

(58) Field of Classification Search ............. 709/106, 709/203, 219, 225; 707/9, 10, 104.1; 705/14, 705/26, 27

See application file for complete search history.

(56) References Cited

U.S. PATENT DOCUMENTS

| | | | |
|---|---|---|---|
| 5,678,041 A | 10/1997 | Baker et al. | |
| 5,930,764 A | 7/1999 | Melchione et al. | |
| 6,014,638 A | 1/2000 | Burge et al. | |
| 6,141,528 A | 10/2000 | Remschel | |
| 6,141,694 A * | 10/2000 | Gardner | |
| 6,162,060 A | 12/2000 | Richard et al. | |
| 6,173,153 B1 | 1/2001 | Bittman | |
| 6,208,832 B1 | 3/2001 | Remschel | |
| 6,236,977 B1 | 5/2001 | Verba et al. | |
| 6,270,351 B1 | 8/2001 | Roper | |
| 6,279,112 B1 | 8/2001 | O'Toole, Jr., et al. | |
| 6,285,983 B1 | 9/2001 | Jenkins | |
| 6,289,348 B1 * | 9/2001 | Ricahrd et al. | ............. 707/106 |
| 6,411,796 B1 | 6/2002 | Remschel | |
| 6,560,592 B1 | 5/2003 | Reid et al. | |
| 6,652,287 B1 * | 11/2003 | Strub et al. | |

* cited by examiner

*Primary Examiner*—Andrew Caldwell
*Assistant Examiner*—Stephan Willett
(74) *Attorney, Agent, or Firm*—Foley Hoag LLP

(57) ABSTRACT

Methods and systems for verifying a user as a member of an affinity group, including receiving user information identifying a user identity and at least one affinity group, and based on the user information, querying at least one networked data source to associate at least one status with the user information. The user information can include at least one of a name, a user name, a social security number, a group identification number, a personal identification number, a member number, a password, a telephone number, a loan number, an email address, a mailing address, a certificate number, and an employee number, for example. The methods and system can thus provide an offer to the user based on the status associated with the user. A threshold can be used in some embodiments to determine whether a further query can be performed to verify status within the affinity group.

30 Claims, 11 Drawing Sheets

USER MATRICULATION STATUS DETERMINATION VIA A COMPUTER NETWORK

CLAIM OF PRIORITY

This application claims priority to U.S. Ser. No. 60/379,485, entitled "Network Verification Systems and Methods", filed on May 10, 2002, naming Sunil Thambidurai and Tore Christiansen as inventors, the contents of which are herein incorporated by reference in their entirety.

BACKGROUND (1) Field

The disclosed methods and systems relate generally to verification systems and methods, and more particularly to verifying student status.

(2) Description of Relevant Art

The market for selling discounted products and services to students can be very profitable for suppliers of products and services. Some suppliers make these promotional offers to students based on excess that may not otherwise be purchased, while other suppliers may reserve a certain percentage of products/services for distribution to students. In either case, such promotional marketing can assist a supplier in obtaining recognition and market awareness among an important demographic. Because the promotionally priced products and services can be heavily discounted from the non-discounted prices, it can be significant to the suppliers to ensure that a purported student is actually a student, and not a customer that should be paying a non-promotional price.

International Student Identity Cards (ISICs) can be obtained through a mail-in application that requests that a purported student supply information including a school declaration with school seal, a letter on school stationery from the registrar or dean indicating enrollment, a transcript, a letter of acceptance, or a validated college or university ID card. Students with the ISIC can thereafter qualify for promotional offers available to students by providing, supplying, or otherwise showing their ISIC. Unfortunately, ISIC issuing and audit controls can be non-existent and/or ineffective. For example, as provided herein, a purported student can obtain an ISIC by supplying a letter of acceptance. In this example, in exchange for a college application fee, an individual can submit an application, receive a letter of acceptance, and thereafter receive an ISIC without enrolling. Such a non-student could then receive significant discounts through the promotional product/service offerings reserved for students.

SUMMARY

The methods and systems include an educational institution status verification method that includes receiving user information identifying a user identity and an educational institution, and, based on the user information, querying at least one networked data source to associate at least one student status with the user information. The at least one networked data source can include at least one networked data source accessible by at least one of an internet, an intranet, a local area network (LAN), and a wide area network (WAN). The received user information can include at least one of a name, a user name, a social security number, a personal identification number, a student identification number, a password, a year of graduation, a telephone number, a student loan number, an email address, a mailing address, a dormitory name, and a degree identifier. The at least one networked data source can include at least one networked data source associated with the educational institution. The at least one networked data source can also include at least one of an online student directory, an online student listing, a student database, a financial database, a credit database, a government database, a marketing database, and an email database.

The query of the at least one networked data source can include at least one of a hypertext transfer protocol (HTTP) request, a SQL query, a telnet command, a Java Remote Method Invocation (RMI), and an extensible Markup Language (XML) Remote Procedure Call (RPC). Based on the query, for example, a student status can be determined that can be a verified student status, a non-verified student status, a matriculated status, a non-matriculated status, a formerly matriculated status, and an unknown status. The user information and the associated at least one student status can be stored, for example, in a database. The received user information can be provided by at least one of a processor network, a telephone network, a postal service, and hand delivery. Accordingly, the methods and systems include receiving at least one off-line data that includes at least one of data from a telephone, a document examination, a student enrollment catalog, a student list, and a student identification card.

The methods and systems can query the at least one networked data source by querying at least one first data source to determine whether the user information is associated with a student status, based on the query of the first data source, comparing the association of the user information and student status to a threshold, and, based on the comparison, querying at least one distinct second data source. Similarly, in an embodiment, the methods and systems can query at least one networked data source to determine whether the user information is associated with a student status, and, based on the query of the first data source, query at least one distinct second data source. Additionally and optionally, the methods and systems include querying at least one first data source to determine whether the user information is associated with a student status, based on the query of the first data source, comparing the association of the user information and student status to a threshold, and, based on the comparison, determining that a further query is unnecessary.

In an embodiment, the user can be provided with data associated with the at least one student status associated with the user.

In an educational institution embodiment, the methods and systems include querying at least one networked data source to associate at least one faculty status with the user information, although other affinity groups associated with educational institutions can also be included. For example, in the faculty affinity group, the querying of the at least one networked data source includes querying the at least one networked data source to associate the user information with at least one of a full-time faculty status, a part-time faculty status, an associate faculty status, a tenured faculty status, a non-tenured faculty status, and an unknown faculty status.

The methods and systems can associate an identifier with the user information and the associated at least one student (and/or faculty and/or other affinity group member) to allow, for example, a logon or user identity.

The methods and systems also include obtaining status verification data from the at least one networked data source, comparing the status verification data to a threshold, and, based on the threshold, performing a further status verification.

In an embodiment, the methods and system include a method for providing at least one offer to a verified educational institution user, including receiving user information identifying a user identity and an educational institution, based on the user information, querying at least one networked data source to associate the user information with at least one of a student status and a faculty status, and, based on the status associated with the user, providing the user with information associated with the at least one offer. Providing the user with information associated with the at least one offer includes providing the user with information to accept the at least one offer. Providing the user with information associated with the at least one offer can also include informing a supplier of the at least one offer that the user accepts the at least one offer.

The disclosed methods and systems include a system to provide offers to a verified educational institutional user, where the system includes at least one processor for receiving user information identifying a user identity and an educational institution, instructions for causing the at least one processor to query, based on the user information, at least one networked data source to associate the user information with at least one of a student status and a faculty status, and, instructions to cause the at least one processor to provide, based on the association, information for at least one offer to the user. The instructions to query include instructions to query at least one first data source to determine whether the user information is associated with an affinity group status, based on the query of the first data source, compare the association of the user information and affinity group status to a threshold, and, based on the comparison, query at least one distinct second data source. The instructions can also provide at least one web page for receiving at least one of the offers and the user information. The system can also include at least one of an offer database for storing offer information from offer suppliers, and a student status database for storing user information and associated student and faculty verification status. A threshold can be used for comparison against information from the at least one networked data source. The threshold can include at least one of a time and a date, for example. The offer information can include offers associated with at least one of airline flights, trains, hotels, insurance, and travel. The user information and/or the offer information can be provided based on at least one of a processor device, a postal service, a hand delivery, and a telephone.

Other objects and advantages will become apparent hereinafter in view of the specification and drawings.

DESCRIPTION

Figure 1:
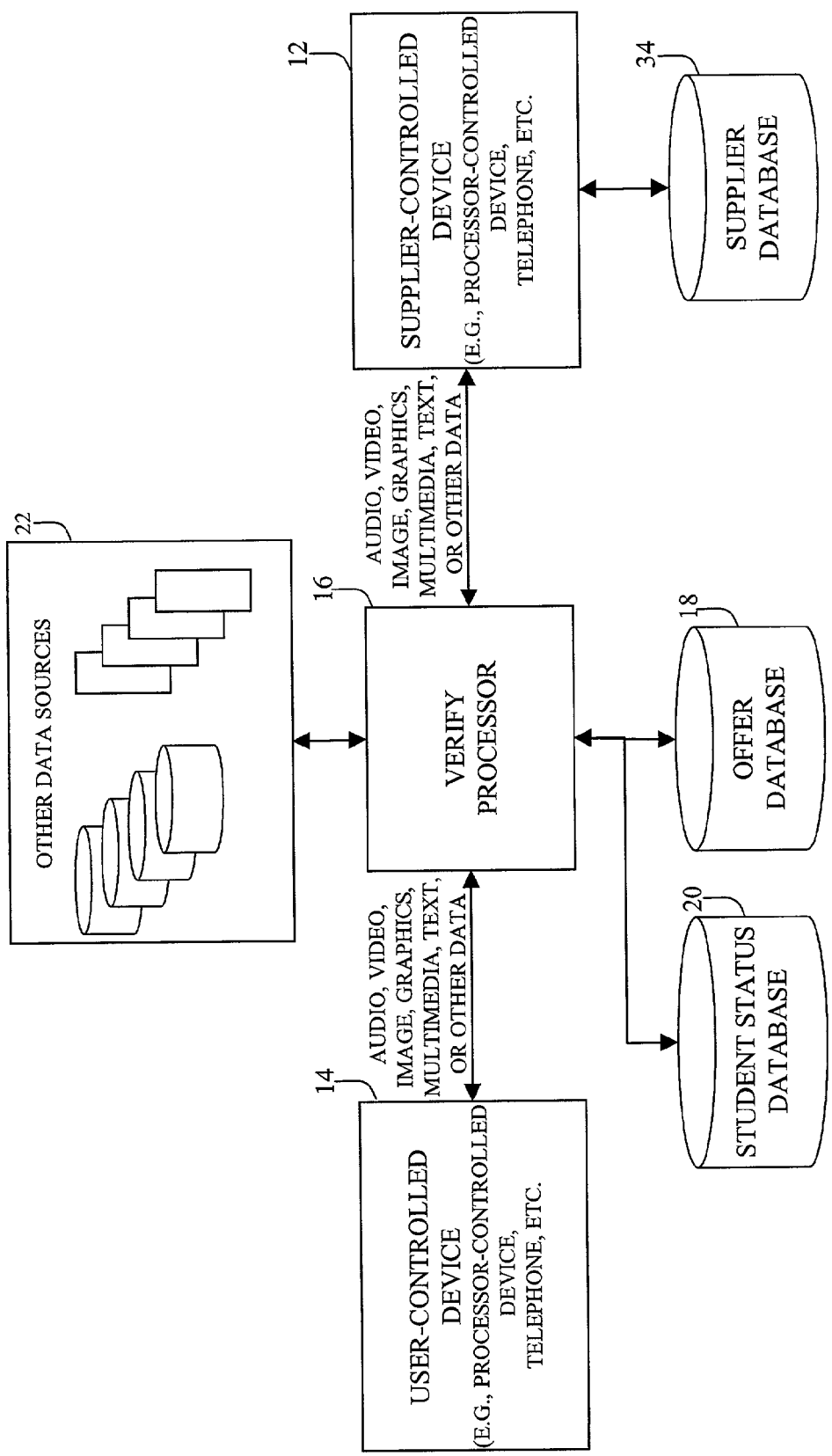
FIG. 1 provides an illustrative example of some communications between a verify processor and some of the other components communicatively accessible to a verify processor.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods.

The disclosed methods and systems verify status for an affinity group that can be understood herein to include a group that can include associated members. Examples of affinity groups may include groups based on age (e.g., less than twelve years old, teenagers, eighteen or older, twenty-one or older, sixty-two or older, sixty-five or older, twenty-five to forty-nine), demographic groups (e.g., living in a specified zip code, within an annual income range, of a certain ethnicity, of a certain race, of a certain religion, etc.), professional groups (e.g., Screen Actors Guild, Bar Association, Institute of Electronics and Electrical Engineers, Teamsters, etc.), social groups (e.g., boy scouts, girl scouts, eagle scouts, Knights of Columbus, Elks Club, etc.) membership clubs (e.g., National Rifle Association, Health clubs, etc.), groups based on a level of achievement or status (e.g., alumni associations, student status, faculty status, Vietnam veteran, enlisted military, etc.), employment (e.g., government workers, workers in a particular industry, employees of a specific company, etc.), or another group, with such groups provided for illustration and not limitation, and those of ordinary skill in the art will recognize that a group can be defined or otherwise articulated using one or more demographic or other criteria. Groups such as those provided herein can be further divided into subgroups, and hence the methods and systems herein can also be applied to or otherwise used with such subgroups.

To better explain the disclosed methods and systems, the methods and systems can be illustrated with respect to student status for a user on a computer or processor network to enable the user to accept promotional offers, where such offers are preferably directed by the offer suppliers toward students. In some embodiments, the users may not view or otherwise have access to the offers until the user is verified as a student, while in some embodiments, the users may view the offers before their student status is verified ("status verification"), however users in such an embodiment may not be able to accept or otherwise participate in the offers until status verification occurs. An offer supplier may determine whether offers can be viewed before and/or after status verification, and hence some offers may be presented to the user before status verification, while others may be presented after status verification.

For the disclosed methods and systems, an offer can be understood to be an offer of products and/or services directed to a student consumer. For example, offers can include products and services such as entertainment (e.g., concert, movie, theatre, museum, sporting, television, radio, or other promotional event), health and beauty, accessories (e.g., jewelry), furniture, software, electronics, travel (e.g., airline, hotel, car rental, etc.), clothing, sporting equipment, and leisure products (e.g., music, art, etc.), among others, with such examples provided for illustration and not limitation. The entity supplying the offer can be an entity authorized to sell the product. For example, if the offer involves airline tickets, the offer can be provided by a travel agent and/or an airline. One of ordinary skill in the art will recognize that the offers may be group-dependent, for example, where life insurance can be provided to members of a certain age group.

The disclosed methods and systems thus provide a system for accumulating, collecting, or otherwise accepting offers from suppliers of offers. This collection system can be a processor-controlled device such as desktop computer, a workstation, server, handheld computer, personal digital assistant (PDA), cellular telephone, or another processor-controlled device wherein the processor includes instructions for allowing the device to perform as provided herein. For the disclosed methods and systems, this processor-controlled device can be referred to as a "verify processor," 16 as depicted in FIG. 1 that shows some of the devices and other components with which a verify processor 16 can communicate. Those of ordinary skill in the art will recognize that the verify processor, like other disclosed processor-controlled devices provided herein, can be understood to include one or more processors that can be configured to perform the features attributed to the processor-controlled device. Such one or more processors can reside on a single device or multiple devices, and can communicate via wired and/or wireless communications. The verify processor 16 can also thus provide the offers to the users per criteria provided by the supplier of the offer, and/or per criteria provided by a system administrator associated with the verify processor 16. The verify processor can thus communicate with suppliers of offers, users, and/or other data sources that can assist in status verification. The verify system can utilize wired and/or wireless communications to communicate data from and/or to the suppliers of offers, the users, and/or the other data sources.

As FIG. 1 indicates, the offers can be provided to the verify processor 16 via a supplied-controlled device 12 that can include a processor-controlled device, as previously provided herein, but can also include other modes of communication such as telephone, postal service, in-hand process, or another mode of communicating information regarding the offer. In the illustrated embodiments, the offer information can include offer category or type (e.g., airfare, health/beauty, entertainment, etc.), offer particulars including offer-event time(s), event date(s), price, and time restrictions for accepting the offer. Such offer information is provided herein for example, and not for limitation, and different embodiments can vary the offer information to include more information, less information as provided herein, and/or combinations thereof. For example, offer category or type may not be included in some embodiments. Accordingly, as provided in FIG. 1, the offer information can be communicated by a mode that facilitates the transfer of the offer information to the verify processor 16, and can include manual or electronic transmission of audio, video, image, graphics, multimedia, text, or other data. For example, the offer information can be transmitted via a processor network such as the internet by allowing an offer supplier to download a web page associated with the verify processor 16, and allowing the offer supplier to provide offer information using one or more data entry fields, check-boxes, drop-down menus, text boxes, or other data entry mechanism, etc., and submitting such data to the verify processor 16 as is known in the art for communicating hyper-text markup language (HTML) data using hyper-text transfer protocol (HTTP). Such offer information can be electronically received and/or processed by the verify processor 16 or a processor related thereto. As provided previously herein, other communications protocols and data entry methods can be used without departing from the scope of the disclosed methods and systems, and the methods of receiving data at the verify processor 16 can include manual and electronic, and combinations thereof. In an embodiment according to FIG. 1 wherein the supplier-controlled device 12 is a processor-controlled device, the processor-controlled device 12 can communicate with one or more supplier databases 34 that can include data associated with the offers to be supplied to the verify processor 16.

Additionally and optionally, an offer supplier for an embodiment according to FIG. 1 can utilize a telephone 12 to transmit offer information to the verify processor 16 where such audio and/or other communicated data can be received electronically by the verify processor 16 or via a human contact associated with the verify processor 16, wherein the human contact can thereafter manually enter the offer information for access by the verify processor 16. Other methods to provide offer information, as provided herein, include postal delivery, in-hand delivery, and other modes.

As will be provided herein with respect to the illustrated embodiments, some embodiments enable the verify processor 16 to maintain and update one or more databases. The databases can include, for example, an offer database 18 and a student status database 20. Those of ordinary skill in the art will recognize that references herein to a database can include one or more well-known databases such as Oracle, SQL Server, MySQL, Informix, or another commercial database, and additionally and optionally can include one or more processor-readable components arranged to organize data attributed to such "database" for storage and retrieval as provided herein, and can include, for example, linked lists, queues, trees, or another data structure. Accordingly, the term database can be understood herein to include the aforementioned structures.

For an embodiment according to FIG. 1, the verify processor 16 can accumulate or otherwise store offer information in the offer database 18 to facilitate requests from users for offer information. The offer database 18 can include the offer information previously provided herein, subsets thereof, and/or additional data associated with an offer, or combinations thereof. For example, some offer information may be designated in the database as available to unverified users, while some offer information may be designated in the database as available to verified users. Those of ordinary skill in the art will recognize that there are many ways to organize, arrange, and compile the offer information, and such organization can be application dependent and based on, for example, efficiently processing queries to the database 18.

User(s) can also communicate with the verify processor 16 to obtain information regarding offers, and to facilitate the offer acceptance. As provided herein, the verify processor 16 can, at a minimum, prevent offer acceptance by a user until such user's student status is verified.

As provided in FIG. 1, users can also access the verify processor 16 using a user-controlled device 14 that can include a processor-controlled device such as the previously provided devices, or a telephone, for example. In one embodiment, the users can access the verify processor 16 using a processor-controlled device that is capable of accessing the internet. A user can thus download a web page associated with the verify processor 16. The web page may be a different web page than a web page that may be associated with an offer supplier, or such web pages may be the same. In one embodiment, a web page can provide text boxes, drop-down menus, and/or check boxes to allow the user to identify themselves as a first time user, or alternately, to provide a previously provided login identification and login authorization. The user can also access the verify processor 16 using other user-controlled devices 14 such as, for example, a telephone. In such an embodiment, the user can utilize tones to communicate with the verify processor 16 and navigate an automated menu and/or query that can retrieve user information and provide offers utilizing audio data. Additionally and optionally, a user can access an operator or other individual to provide spoken identification and authentication, and verbal receipt of offer information.

A first time user can provide user information that can include a name and/or group data identifier (e.g., membership number, group identification number, student identification number, user identifier or identification (e.g., "user name"), a user authentication (e.g., PIN), an email address, a home address, a student (college/university/dormitory) address, a student ID number, an educational institutional identifier where the user is enrolled, a social security number, a personal identification number, a password, a year of graduation, a telephone number, a student loan number, an email account, an address, a dormitory name, and/or a degree identifier. The exemplary user information is illustrative and not limiting, and thus some embodiments can use subsets of such information, can include more information, or can utilize other combinations of such information per the application. For example, further user information can include mother's maiden name, and/or one or more user-specified questions and answers. As provided herein, user information that is associated with a user identity and an educational institution can be sufficient for the disclosed methods and systems. Accordingly, for other affinity groups, user information that is associated with a user identity and at least one affinity group can be sufficient for the disclosed methods and systems. Such user information can be transmitted in a variety of ways, can also be provided in a variety of ways, and in some embodiments, a single piece of information or data (e.g., email address (e.g., robert_smith69 college.edu)) can be used to associate the user information with a user identity and an educational institution.

Once a user is registered and/or identified as a previously registered user, the verify processor 16 or an individual associated with the verify processor 16 can cause the verify processor 16 to access one or more data sources 22 that can allow the verify processor 16 to perform status verification. Accordingly, data sources 22 can include a publicly available student directory or listing that can be accessed electronically, and/or as provided herein, manually. For example, based on the user information, a university, college, etc., can be contacted via a query or other electronic communication to determine a student's status. If this information is not electronically available, other electronic data can be accessed and/or queried, including credit bureau/report data that can include student status information, governmental data that can indicate student status, or other data sources 22 that can provide relevant information regarding student status. The electronic query can differ based on the data source 22 and anticipated format of the data source data. Queries can thus be in the form of an HTTP post, a SQL query, telnet commands via a telnet session, Java remote method invocation (RMI), eXtensible Markup Language (XML) Remote Procedure Call (RPC), or another remote call that can be performed. The data sources 22 can thus be network accessible data sources via, for example, the internet, an intranet, a local area network (LAN), and a wide area network (WAN).

If the status verification cannot be determined electronically, manual methods can be used. For example, if a university/college does not maintain electronic copies of their directory or student listing, manual copies can be obtained, telephone calls can be employed, and/or a user can be asked to provide proof of student status via postal, hand-delivery, or other means.

As with other devices, the verify processor 16 can also communicate, via wired and/or wireless communications, with data sources 22. Such data sources 22 can be publicly available without fee, and/or additionally and optionally can be accessed for a fee.

Based on the information obtained from the data sources 22 and/or the user, the verify processor 16 can associate a status with the user: student status verified, or student status not verified. In such an embodiment, "student status not verified" can include users for whom a definitive verification of non-student-status was determined, and also students for whom status could not be definitively determined. Accordingly, some embodiments can employ three status indicators: matriculated, non-matriculated, and unknown. Some embodiments can additionally and optionally include a formerly matriculated student status. In an embodiment, the status may be verified or non-verified. Those of ordinary skill in the art will recognize that other categories and labels for such categories can be used. In some embodiments, the student status can be stored in the student status database 20. Based on the status verification, the student may be allowed to view and/or accept offers.

As provided in FIG. 1, the verify processor 16 can access a student status database 20 that can include data associated with a user and associated status verification results. The database 20 can also include user information data. Accordingly, when a user identifies his/herself as a registered user by providing, for example, a user name/authentication code, or other such user information that can identify the user, the student status database 20 can be accessed to determine whether the user's status is known. The student status database 20 can also include threshold data that can be based on the data sources 22 and other data employed to verify a user. The threshold can be, for example, a length of time for which a student's status can be considered valid. The threshold can be a date and/or time, for example, that can be computed when the student's status is verified. If the current date/time is beyond or otherwise does not satisfy the threshold data, a further status verification may be performed and a new threshold can be computed. Thresholds can vary based on the status verification data, and/or thresholds can vary based on college/university curriculum (semester, quarter, etc.), time of year (summer session, fall session, etc.), periods within which students can withdraw while receiving a refund from the educational institution (college, university, etc.), expected graduation date as supplied by a user, computed or anticipated graduation date, expected obsolescence of a student directory or other data from which the status verification was performed, and/or other criteria, where such criteria provided herein are provided for illustration and not limitation. In some embodiments, the threshold can be a fixed period independent of the date of status verification, while additionally and optionally, the threshold can be a fixed period that depends on the date of status verification. In one embodiment, the threshold can be the same for all users. The threshold can be provided by a system administrator associated with the verify processor 16, and/or the threshold can be provided at least in part by an offer supplier 14.

Based on the aforementioned principles that allow components of the illustrations to be otherwise combined, etc., the student database 20 can be understood herein as one of the data sources 22 that can be accessed by the verify processor 16. Accordingly, although the illustrations can indicate that the student database 20 is distinct, it can be understood that such distinction is merely for illustrative purposes and that the student database 20 is an optional feature that may be used as an additional data source 22 in some embodiments, for example, to provide increased efficiency.

Figure 2:
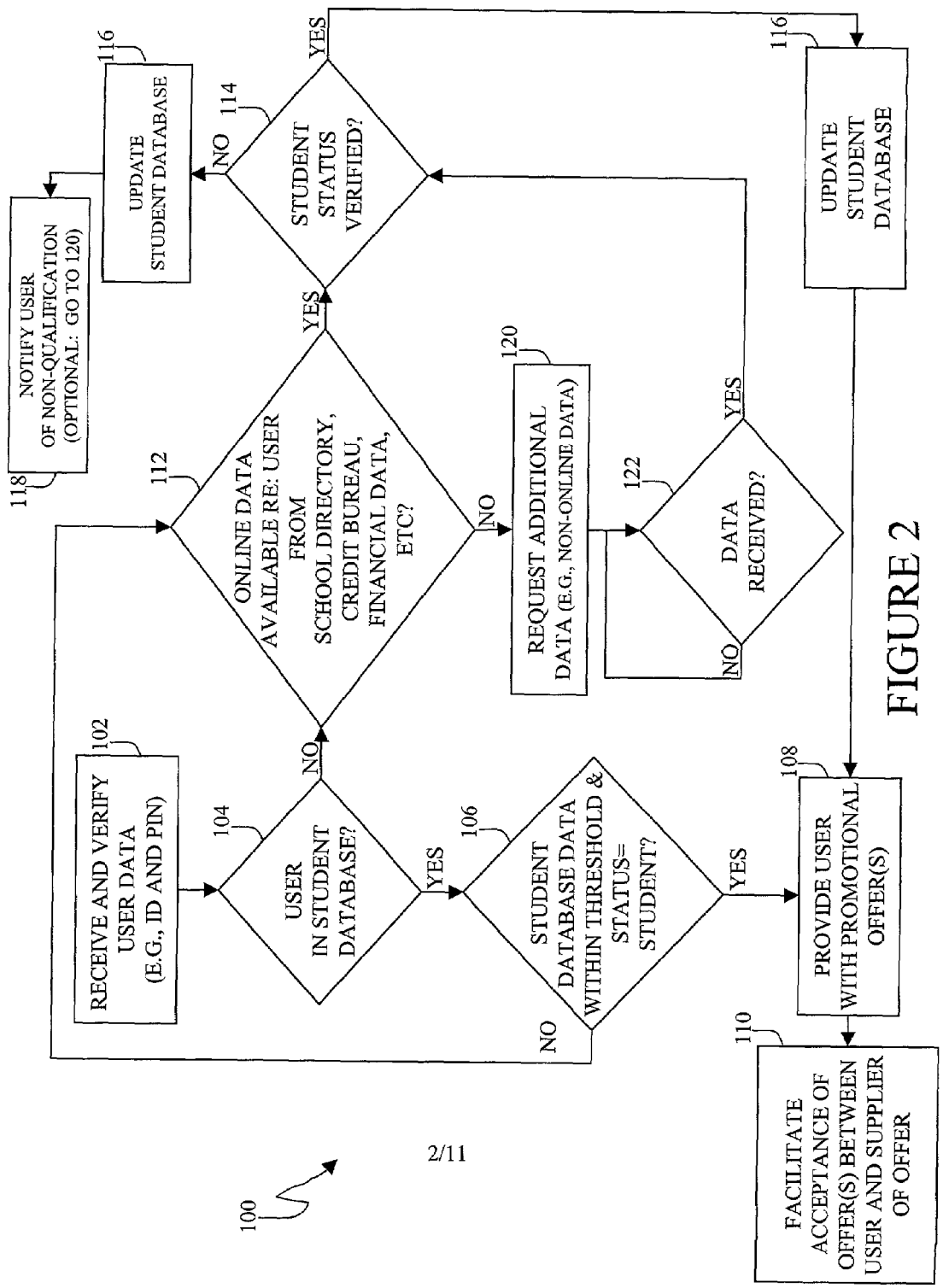
FIG. 2 illustrates features for one embodiment of a verify processor.

FIG. 2 provides a block diagram demonstrating the features of a verify processor 16 for the disclosed methods and systems 100. As provided herein, the verify processor 16 can receive user information 102 from a user-controlled device 14, where such information can be a user name and a PIN or other authentication data. In some embodiments, a name (or user name) and educational institution can be sufficient to identify and/or otherwise verify a user/student. Accordingly, those of ordinary skill in the art will recognize that there can be different combinations of information that different systems can employ to identify a user/student, and it can be understood that a minimum amount of information can include information associated with a name or other identity information (e.g., social security number, student ID number, etc.) and information that can be associated with or otherwise identify an educational institutional (e.g., school name, school abbreviation, password associated with a school, or other information or data can be associated with an educational institution to identify the educational institution). In some embodiments, a single piece of information may be used to identify both a user identity and an educational institution. Based on the received data, the student status database 20 or other database can be accessed to determine whether the user information is valid (e.g., are user name and PIN a valid combination, are user name and PIN valid, etc.) and whether the identified user is known to the verify processor 16 (e.g., is the user in the student status database or other database?) 104. If the user is known to the verify processor 16 and the user's data indicates that the user is a student, and the student data is within the threshold (e.g., not expired) 106, then the verify processor can cause the user to be provided with information regarding offers 108, and in some embodiments, the verify processor 16 can facilitate offer acceptance 110 between a user and a supplier of the offer. As provided previously herein, the data communications can be provided via telephone (automated or manual selections), internet (download web page, etc.), or another method. For example, when a user accepts an offer regarding, for example, an airfare, the verify processor 16 can collect travel arrangements from the student user, credit card information, and/or other information required by the offer supplier. Similarly, the verify processor 16 can cause the user to view airline restrictions, limited terms for refunds, or other such conditions as provided by the offer supplier and/or a system administrator associated with the verify processor 16. The verify processor 16 can cause the offer acceptance data (e.g., selected flight information, credit card data, etc.) to be communicated, either immediately or at another time, to a supplier-controlled device 12 via electronic communications, postal delivery, telephone communications, in-hand delivery, or another method. Additionally and optionally, the verify processor 16 can provide services including credit card verification, or the verify processor can, for example, upon notice from a supplier regarding credit card invalidity, request further credit card information from a user.

Referring again to FIG. 2, if the verify processor 16 determines that a user is not a registered user 104, if the user/PIN do not match, and/or if the user is a registered user and either the user's status does not indicate student status or the user's status is expired (e.g., does not satisfy the threshold) 106, the verify processor 16 can utilize database information (e.g., registered users) and/or prompt the user for information (e.g., non-registered users), where the verify processor 16 can thereafter use such information to perform electronic queries to perform status verification 112. In an embodiment, status verification can be performed with an intention to maximize accuracy and response time while minimizing costs. Accordingly, in one embodiment, non-fee publicly available electronic databases with faster response times may be accessed first, followed by non-fee publicly available electronic databases with slower response times, followed by fee databases in order of efficiency. Such example is merely for illustration and not limitation.

If, based on the retrieved electronic data, student status can be determined (e.g., matriculated student, a non-matriculated student, or unknown/undetermined) to a specified or otherwise provided level of certainty 114, and the student status is verified 114 such that the user is deemed to be a student, the student status database 20 and/or other database can be updated accordingly with the determined student status 116. A new threshold value, for example, can also be updated. The user can then be provided with offer information 108 and the transaction can be facilitated 110 as previously provided herein. Alternately, if the electronic data is inconclusive and/or does not provide a desired level of certainty 114, in one embodiment, the student status database can be updated with the determined student status 116 and/or the user can be provided an email or other notification (e.g., telephone, postal mailing, etc.) to indicate that student status is not verified 118. In some embodiments, additionally and optionally, the verify processor 16 can proceed to 120 to request that the user provide other information in a non-electronic form, or a system administrator or other associated with the verify processor 16 can pursue non-electronic data. Processing can continue at 120 also when non-electronic data is unavailable for a user per 112. In such instances, a system administrator or other associated with the verify processor 16 can perform manual or off-line processing or data collection by receiving off-line data via telephoning a college/university, or examining documents provided by the user and/or an associated college/university. For example, the methods and systems include searching a student enrollment catalog, a student list, and viewing a student identification card. Based on the received non-electronic data, a user's status can be verified as a matriculated student, a non-matriculated student, or unknown/undetermined 114, and processing can continue as previously provided herein.

Those of ordinary skill in the art will recognize that the electronic data that can assist the verify processor can include credit databases that indicate student loans in deferment, governmental databases that indicate student loan status, marketing databases targeted to students through agreements or other arrangements with educational institutions (with or without such institutions' explicit consent), and existence of and/or access to defined classes of email address domains (e.g., the ".edu" email domain).

Figure 3:
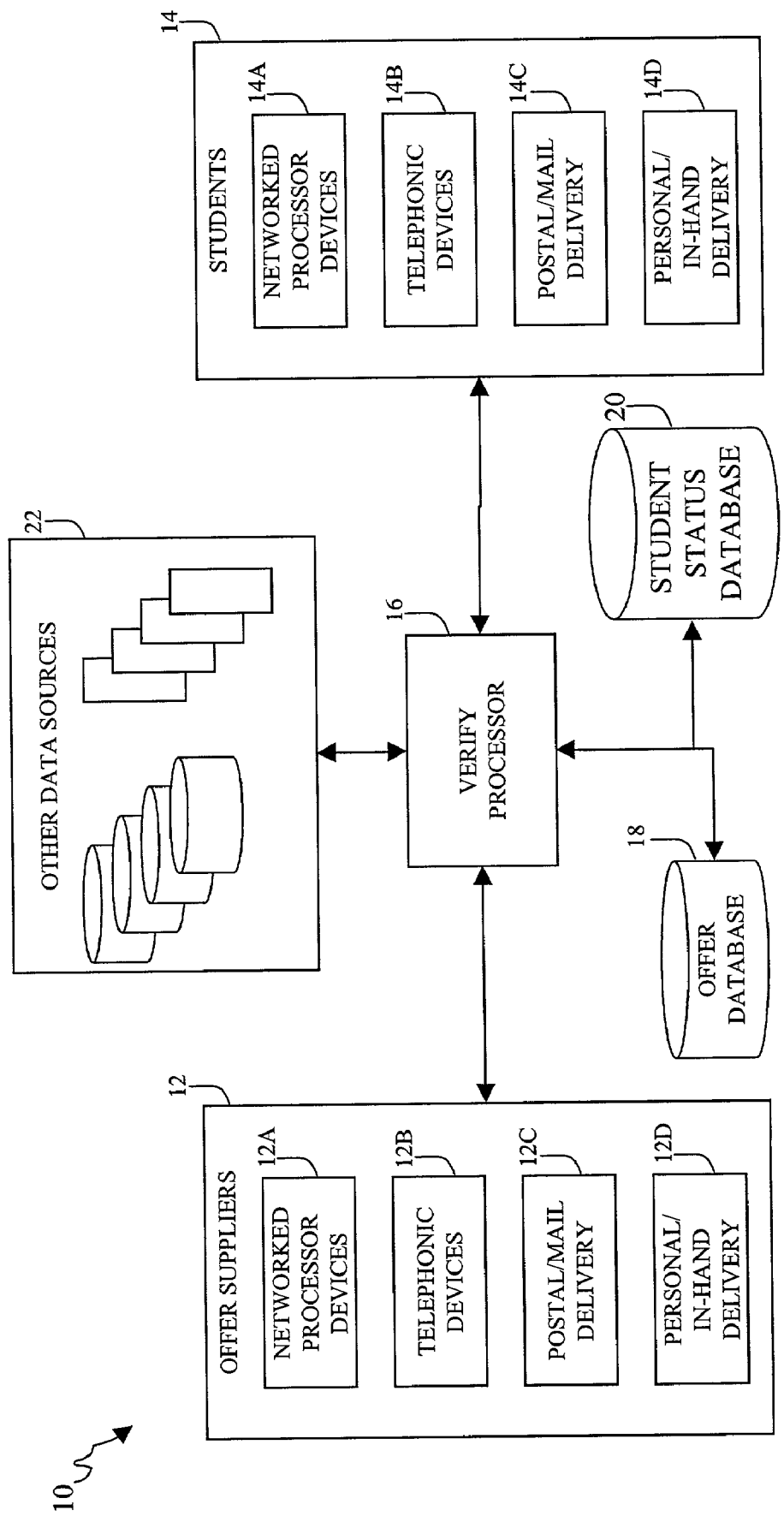
FIG. 3 provides one illustration of a system using a verify processor.

FIG. 3 provides one embodiment for the methods and systems disclosed herein that includes devices and/or components that can communicate with a verify processor 16. As FIG. 3 indicates, suppliers of offers 12 can utilize networked processor-controlled devices 12A to electronically contact the verify processor 16, telephonic devices 12B wherein electronic and/or audio/verbal data can be used, postal mail methods 12C, and personal or in-hand delivery 12D to a system administrator or other associate with the verify processor 16. Similarly, users or students 14 can access the verify processor 16 using the same suite of devices/mechanisms as shown in 14A–14D. Also indicated in FIG. 3 are communications between the verify processor 16 and databases 18, 20 that can be provided by the verify processor 16 or via other processors/system administrators associated with the verify processor 16.

Figure 4:
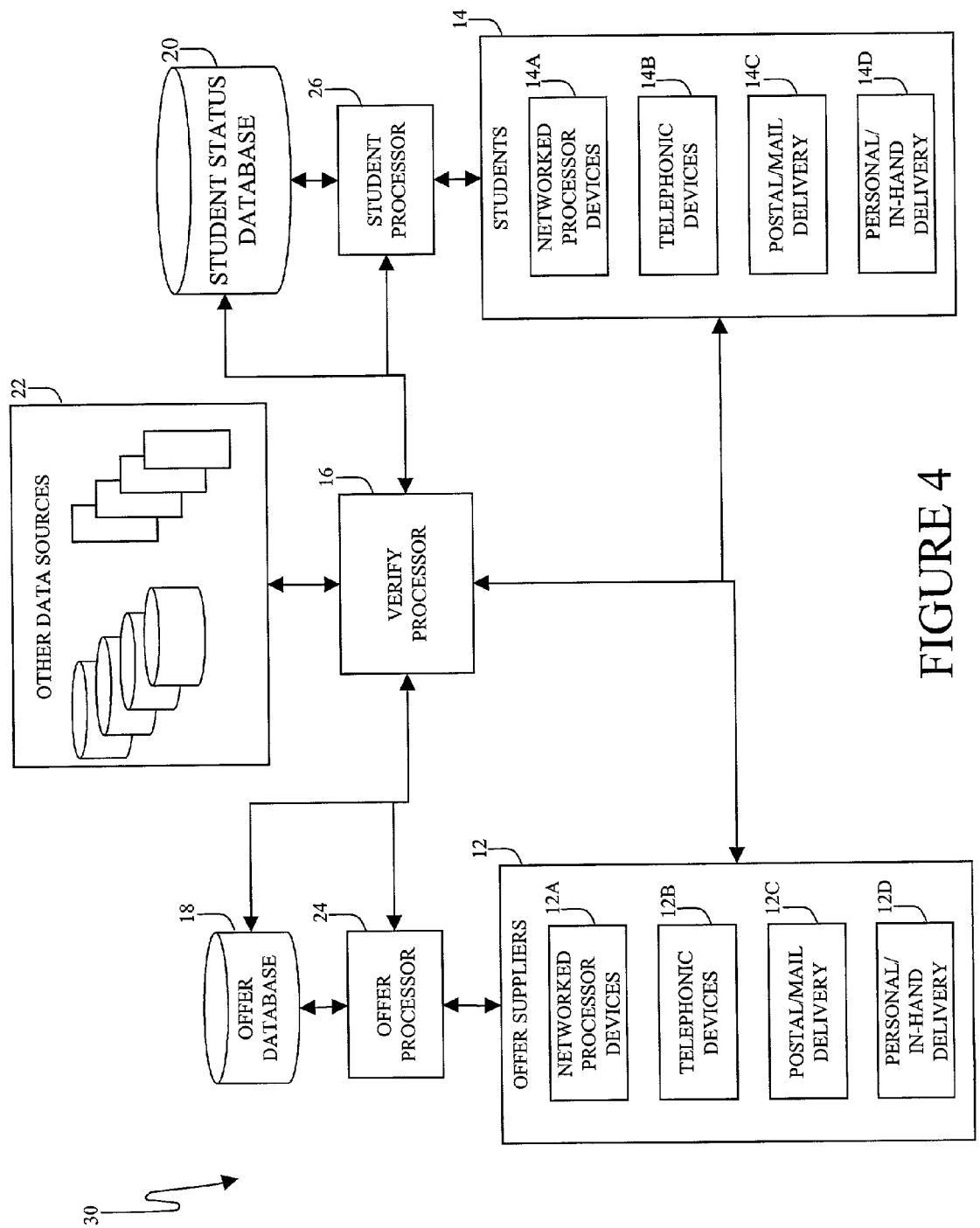
FIG. 4 provides a different illustration of a system using a verify processor.

FIG. 4 thus provides an additional and optional embodiment 30 that includes additional, intermediary processors 24, 26 that can coordinate communications between the offer suppliers 12, the students/users 14, and the verify processor 16. As provided herein, the verify processor 16 can include one or more processors and the features attributed thereto can be distributed accordingly throughout multiple networked processors.

Figure 5:
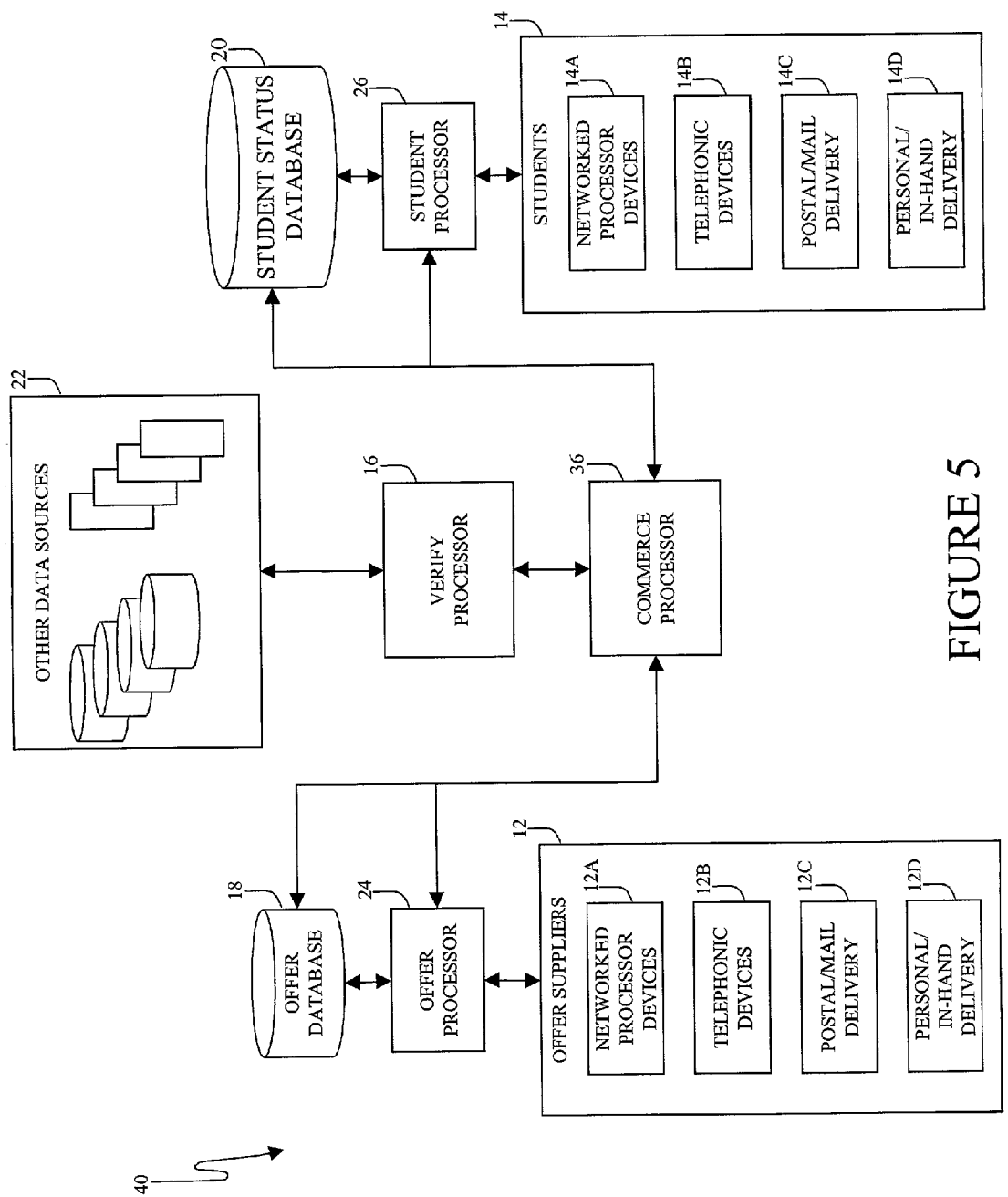
FIG. 5 provides a system using a verify processor and a commerce processor.

FIG. 5 illustrates a system 40 that includes a commerce processor 36 that can perform some features previously attributed herein to the verify processor 16. For example, the illustrated commerce processor can communicate with intermediary processors including the offer processor 24 and the student processor 26 to accept offers (e.g., from offer suppliers) and requests for offers (e.g., from students). The illustrated commerce processor can, for example, also access the student status database 20 and/or the offer database 18. In one example, the commerce processor 36 can accept a request for an offer from a user, query the student status database 20 to determine whether the user is a verified student with updated verification status, and if so, the illustrated commerce processor 36 can access the offer database 18, for example, to provide offers to the user. The commerce processor 36 could also thus facilitate acceptance of the offer by communicating between the user and an offer supplier 12 via the offer processor 24 and/or the student processor 26. Those of ordinary skill in the art will recognize the obvious variations of the proposed embodiment of FIG. 5, that can include, for example, the commerce processor 36 communicating directly with users 14 and/or offer suppliers 12, and/or the commerce processor 36 maintaining an internal or other memory component for the student status and offer information (e.g., an embodiment where the offer database 18 and the student status database 20 may be integrated with the commerce processor 36, as has been provided previously herein as an option, etc.).

In an embodiment according to FIG. 5, when the commerce processor 36 determines that the student status database 20 does not provide sufficient information for appropriate status verification, the commerce processor can communicate a request to the verify processor 16 that can thereafter perform status verification using information provided by the commerce processor 36, where such status verification can be performed as provided previously herein, including accessing the data sources 22. The status verification performed by the verify processor 16 can be communicated to the commerce processor 36 which can inform the user of offers and/or inform the user of a failed verification, as provided previously herein.

Those of ordinary skill in the art will also recognize that the communications paths of the various components in the Figures are illustrative, and some of the illustrated communications may not appear in different embodiments. For example, in FIG. 5, communications between the offer processor 24 and offer database 18 may be optional, and communications between the student processor 26 and student status database 20 can be optional. Furthermore, some communications not shown in FIG. 5 may be included, such as communications directly between the commerce processor 36 and the offer suppliers 12 and/or students/users 14.

Figure 6:
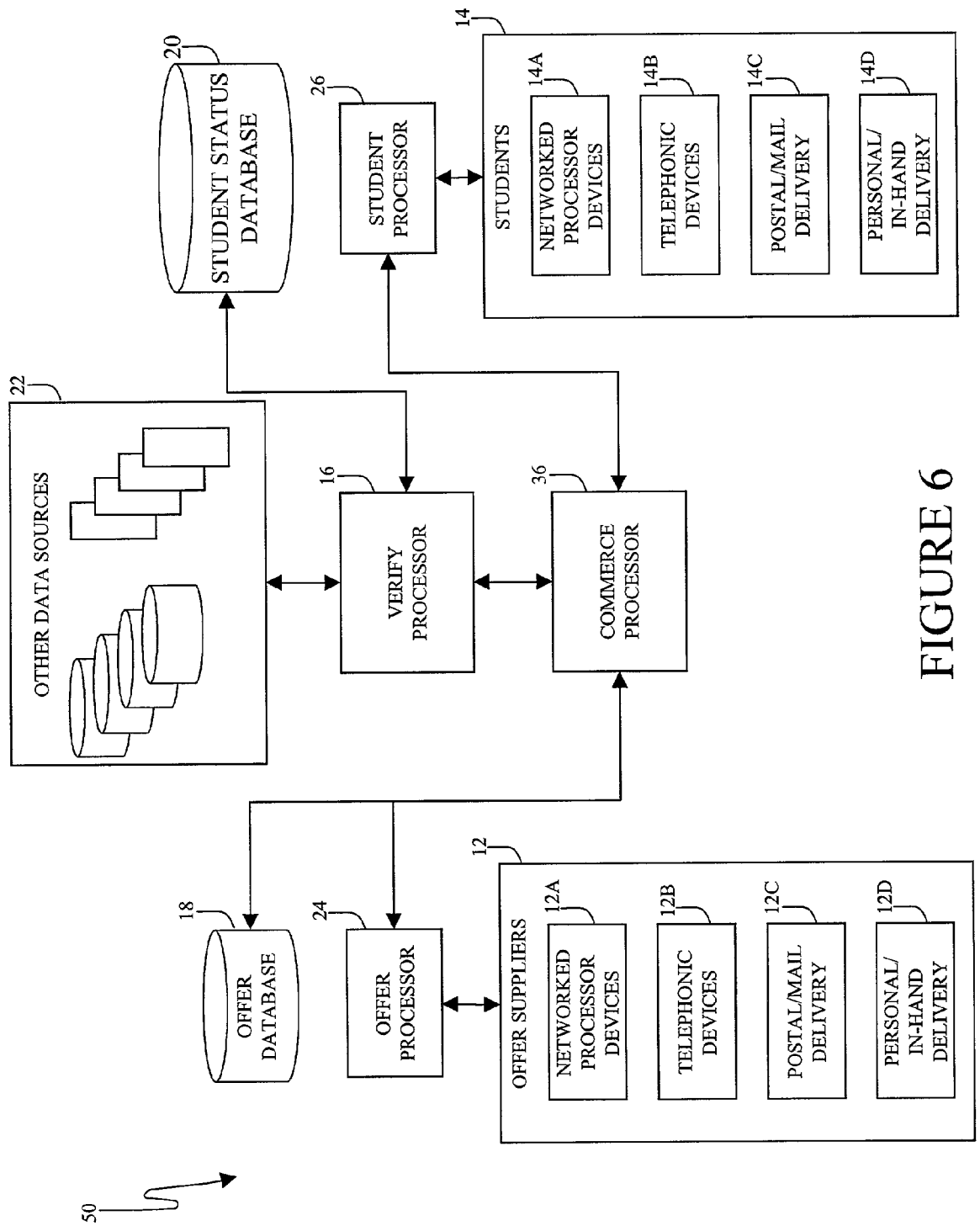
FIG. 6 is another system using a verify processor and a commerce processor.

FIG. 6 provides an embodiment where the commerce processor 36 may not communicate with, for example, the student status database 20. In a system according to FIG. 6, the commerce processor 36 can communicate requests for offers from users to the verify processor 16. The verify processor 16 can thereafter query the student status database 20 to determine whether the user is a valid, registered user, or whether the user should be registered and/or revalidated by using the data sources 22. The verify processor can thus communicate such status verification to the commerce processor 36. Other features of the FIG. 6 commerce processor may be similar to the FIG. 5 commerce processor 36 as provided with respect to FIG. 5.

Figure 7:
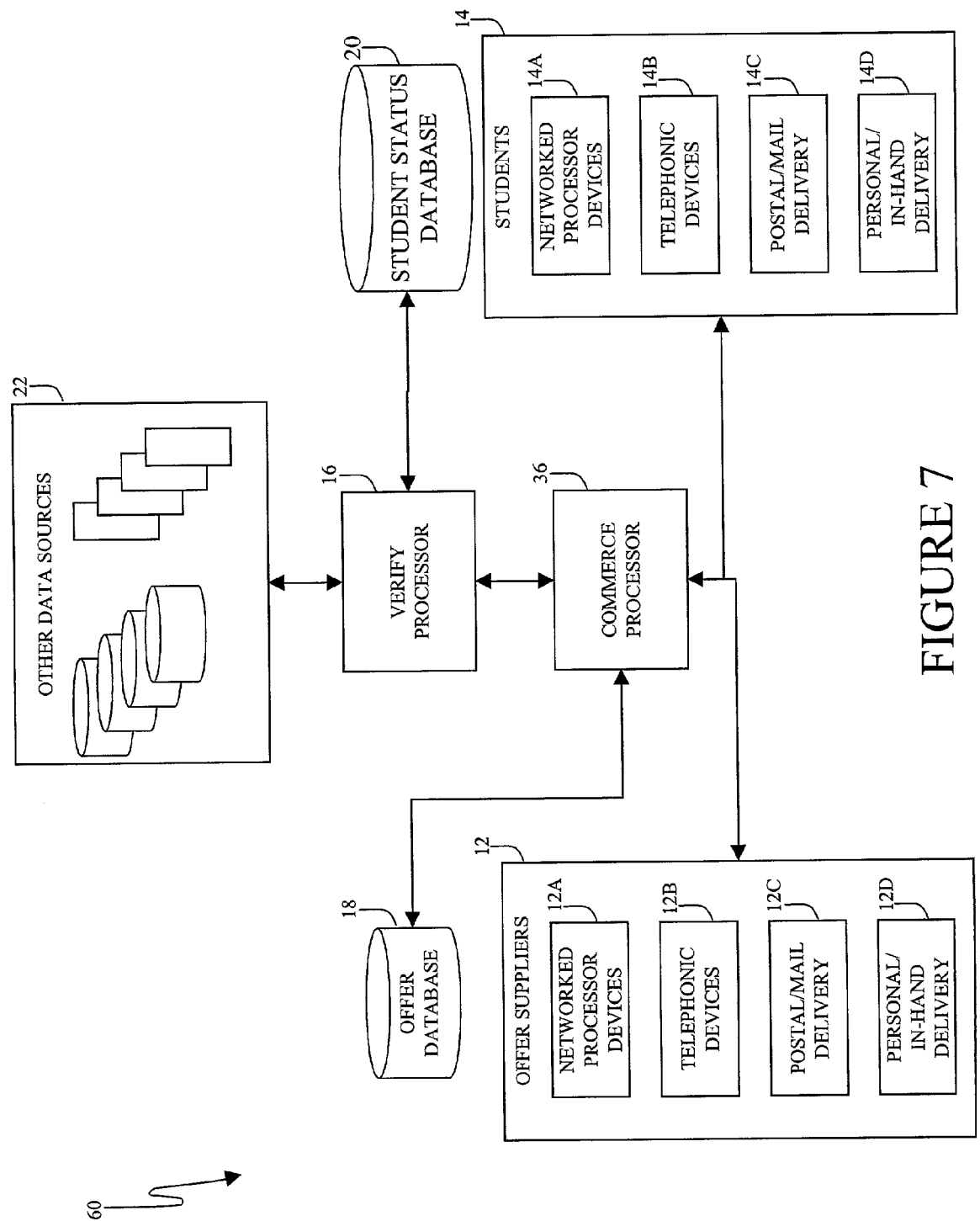
FIG. 7 includes an embodiment with a verify processor and a commerce processor.

FIG. 7 illustrates an embodiment where the commerce processor 36 can communicate directly with the offer suppliers 12 and the users/students 14. User requests can be sent to the verify processor 16 that can communicate with the student status database 20 and the data sources 22, as provided previously herein, to communicate a status verification to the commerce processor 36. The commerce processor 36 can thereafter inform the user/student 14 of the status verification and/or access the offer database 18 to supply the student 14 with offer data/information. The illustrated commerce processor 36 can also facilitate offer acceptance as provided previously herein (e.g., with reference to the verify processor 16). In an embodiment according to FIG. 7, for example, where an offer supplier 12 can communicate electronically with the commerce processor 36, the offer supplier 12 can download or otherwise obtain access to, for example, a web page associated with the commerce processor 36, such that the offer supplier 12 can provide information regarding an offer. The commerce processor 36 can thereafter compile the offer information in the offer database 18 to facilitate, in an example, retrieval of the offer information for presentation to a verified user as provided herein.

Figure 8:
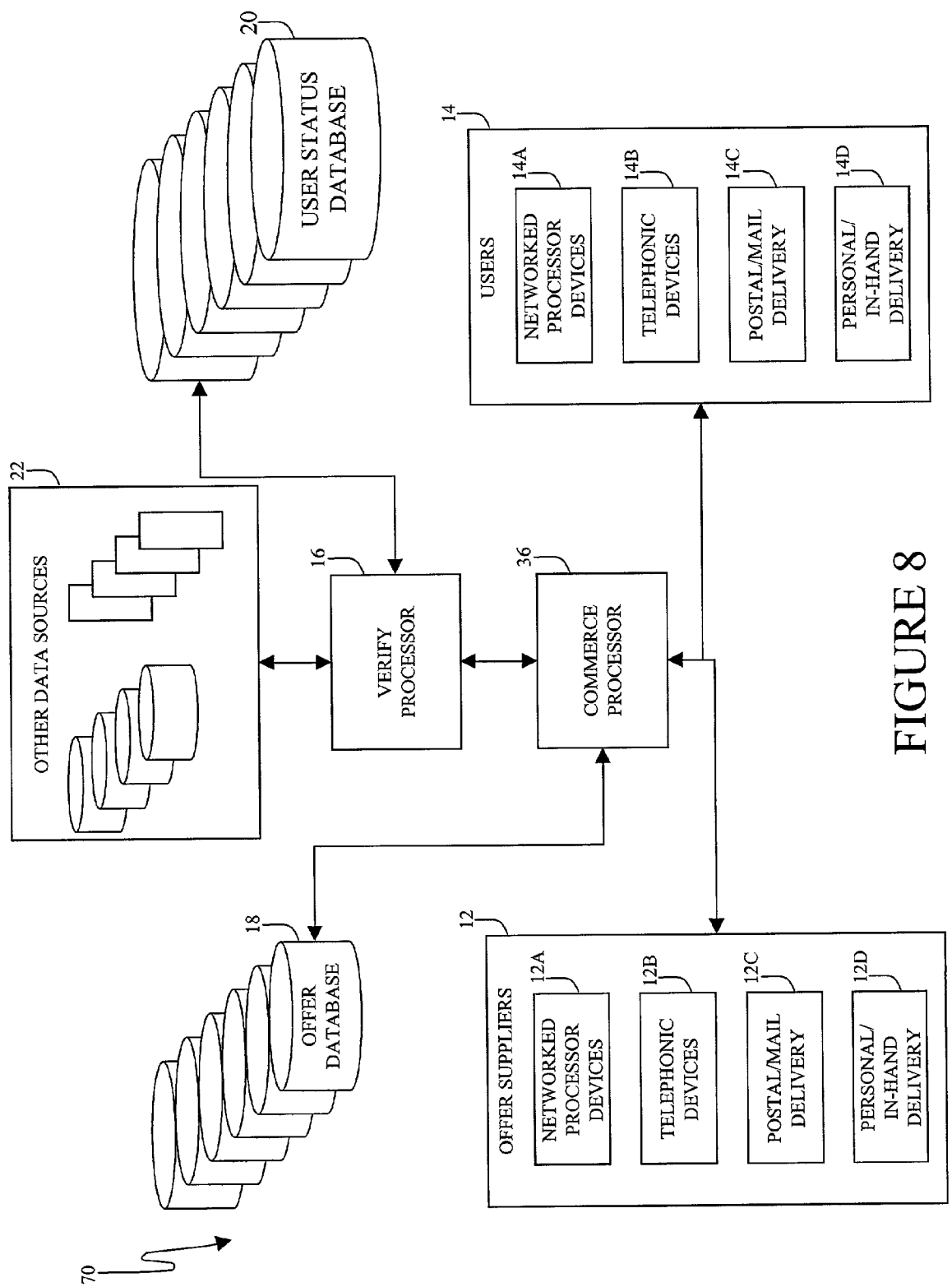
FIG. 8 demonstrates one embodiment with a verify processor and a commerce processor for multiple affinity groups.

FIG. 8 provides one illustration for an embodiment that can be implemented to service multiple affinity groups using a commerce processor 36 and a verify processor 16. As provided in FIG. 8, the users 14 can be members of one or more affinity groups and can provide user information to the commerce processor 36 such that the commerce processor 36 can associate the user with an affinity group. Based on the association, for the illustrated system of FIG. 8, the commerce processor 36 can thereafter determine whether the user's status in the associated affinity group can be verified. The commerce processor 36 can thus communicate a request to the verify processor 16, where the verify processor 16 may receive data or other information to identify the user's affinity group. The verify processor 16 can thus access one or more status databases 20 to determine whether the user is registered user for the user's affinity group, and whether such registration includes a verified status (e.g., based on a threshold or other criteria). As provided previously herein, the verify processor 16 can access other data sources 22 to perform status verification, where the other data sources 22 can be online or electronically available data sources that can be publicly available for a fee or non-fee. For these more generic embodiments, such data sources can include databases associated with websites or other electronically available data sources that may or may not be associated with a website.

When the commerce processor 36 receives the status verification from the verify processor 16 (e.g., either via the status database(s) 20 or other data sources 22), the commerce processor 36 can communicate with the offer database (s) 18 to identify and/or retrieve offers associated with the affinity group for which the user maintains a verified status. The commerce processor 36 can thus facilitate offer acceptance, etc., as provided previously herein.

Those of ordinary skill in the art will recognize that the multiple affinity group illustration of FIG. 8 can be applied to the other illustrated embodiments provided herein, and other embodiments that may not be fully illustrated in the accompanying figures. For the embodiment of FIG. 8, the status databases 20 can be organized per affinity group with a separate database per affinity group, one database for affinity groups, combinations of affinity groups in single databases, or combinations thereof. The offer databases 18 similarly can be configured and/or organized based on affinity group. For example, one offer can be associated with more than one affinity group. Additionally and optionally, one user can be associated with more than one affinity group, and thus one user can have one or more database entries, or one database entry that represents status data for multiple affinity groups. A request to the commerce processor 36 from a single user, for example, could allow the user to be presented with offers associated with multiple affinity groups for which the user maintains a verified status.

Figure 9:
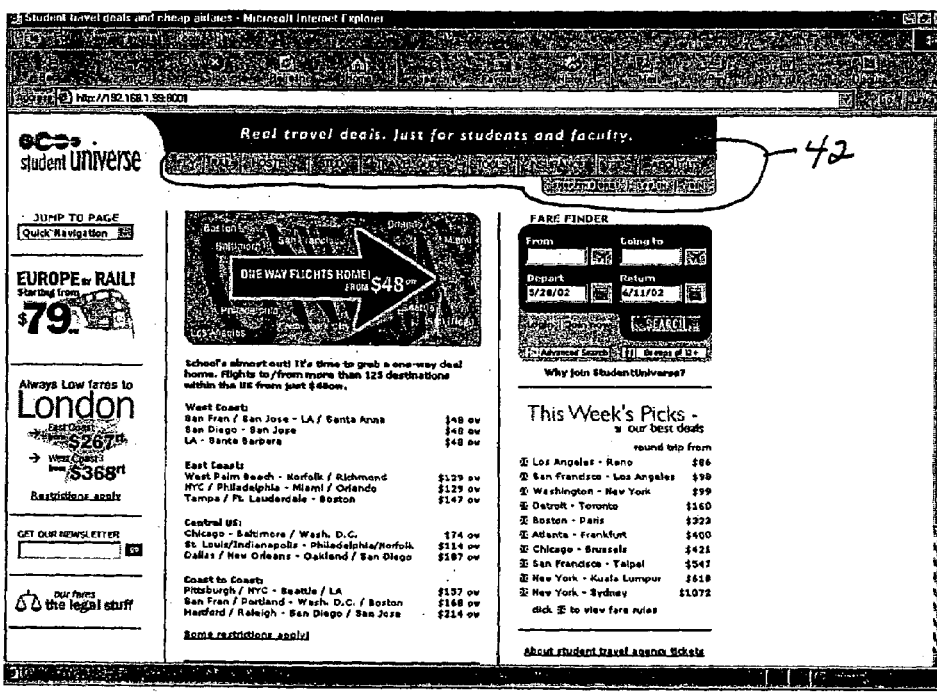
FIG. 9 includes a sample introductory web page for one embodiment of the methods and systems.
Figure 10:
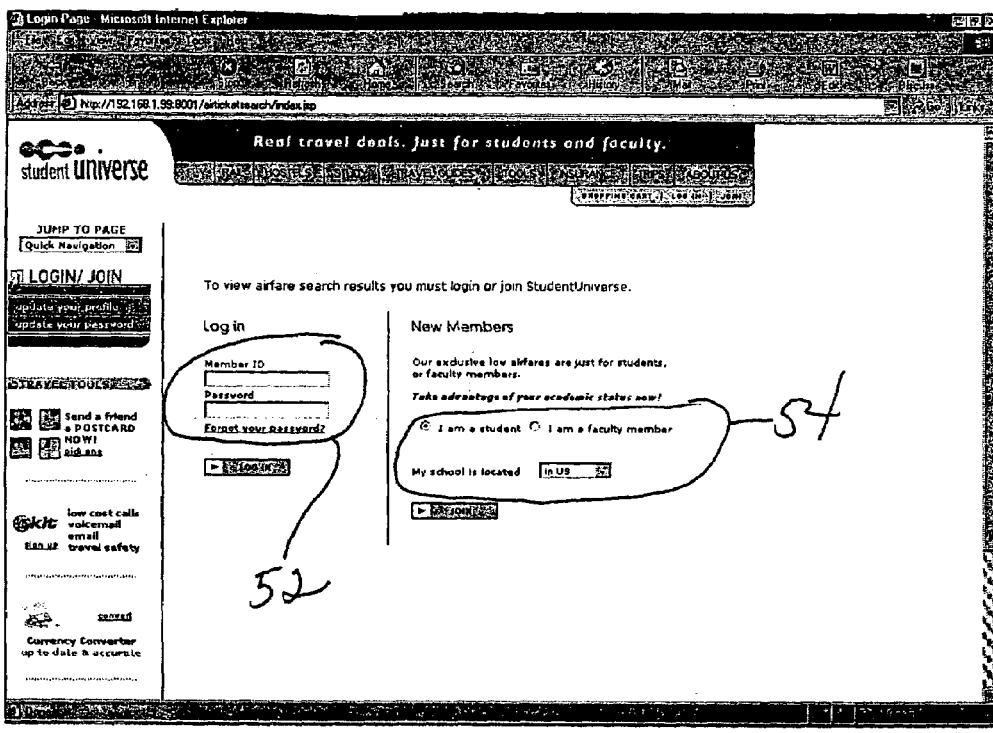
FIG. 10 exemplifies one embodiment for identifying registered and non-registered users; and, FIG. 11 illustrates one web page for informing a user of a failed on-line status verification.
Figure 11:
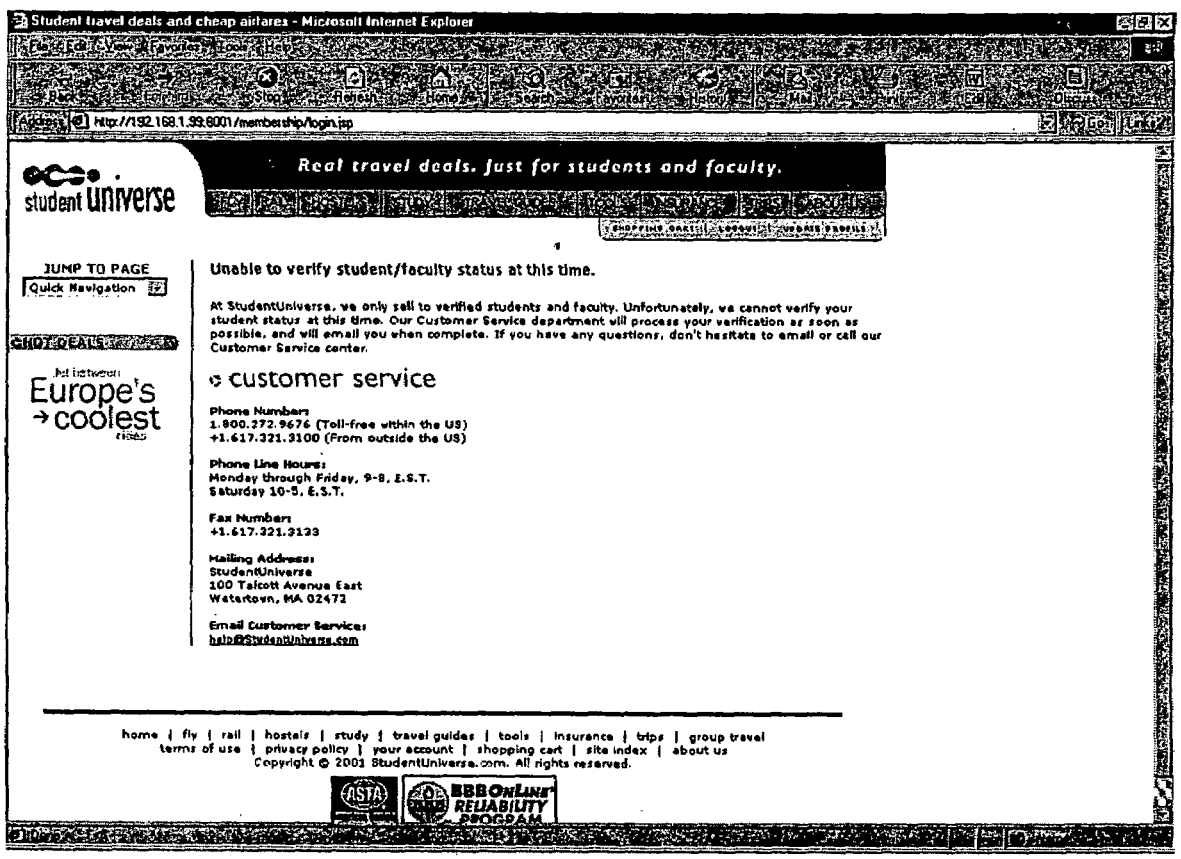

FIGS. 9, 10, and 11 provide illustrations for embodiments where the affinity group is either a student or faculty member. Accordingly, FIG. 9 provides one embodiment for the methods and systems where a user can access a web site and/or page 40 that can be associated with the verify processor 16. For example, the web page can be accessed through a server or other location as is known in the art. As FIG. 9 indicates, a student can be provided with basic information regarding offers, including airfare information and rail information. Tabs 42 can allow a user to navigate through various "pages" on the web site that, when selected, can direct a user to a uniform resource locator (URL) or another web page that can include further information based on the tab. As shown in FIG. 9, the tabs can include offer information for flights, rail, hostels, study, insurance, and trips. A user can also have a shopping cart to display the accepted offers, and there can be a web page and/or URL for logging into the system, and for joining the system (e.g., obtaining a user name, authentication code, and status verification).

FIG. 10 provides one example of a URL and/or web page that can be provided to a user that selects a tab 42 in the FIG. 5 embodiment. Accordingly, although all users can view the FIG. 5 information and/or web page, other web pages can be restricted to registered users. Accordingly, in the illustrated embodiment, user selection of a tab 42 can cause the FIG. 10 web page 50 to appear, requesting information from the user to determine whether the user is a registered user or a new member. Registered users can provide a user name and an authentication code that is labeled "password" 52. Unregistered users can specify whether they are a student or a faculty member, the location of their school 54, and submit such information for further questions. As provided herein, based on the user information collected, a previously registered user can be provided information and/or status verification can occur, or a new user can be subjected to status verification. As FIG. 10 indicates, the illustrated embodiment of FIG. 6 provides offers to students and faculty, and accordingly, faculty status (e.g., verified, non-verified, full-time faculty, part-time faculty, associate faculty, tenured faculty, non-tenured faculty, unknown, etc.) can similarly be verified per the methods and systems provided herein for student status verification. Such embodiments of the disclosed methods and systems can be understood as educational institution verification methods and systems, where other affinity groups associated with an educational institution can be within the scope of the embodiments known as educational institution verification methods and systems.

If the student or faculty status cannot be verified, the user can be directed to a URL or web page according to FIG. 11. As FIG. 11 indicates, a user can be informed of the failed verification, and accordingly be informed of a manual or other process. Once results from further verification efforts are generated, an email can be provided to the user.

What has thus been described are methods and systems for verifying a user as a member of an affinity group, including receiving user information identifying a user identity and at least one affinity group, and based on the user information, querying at least one data source to associate at least one status with the user information. The user information can be data received from a processor controlled device, and can include at least one of a name, a user name, a social security number, a group identification number, a personal identification number, a member number, a password, a telephone number, a loan number, an email address, a mailing address, a certificate number, and an employee number, for example. The data source can be at least one networked database and at least one directory listing. The methods and system can thus provide an offer to the user based on the status associated with the user. In some embodiments, the offer can be associated with at least one affinity group, and can be specified as such by the offer supplier, and/or by a system administrator. The methods and systems include querying at least one first data source to determine whether the user information is associated with an affinity group status, based on the query of the first data source, comparing the association of the user information and affinity group status to a threshold, and, based on the comparison, querying at least one distinct second data source. Furthermore, the methods and systems, upon querying the at least one data source, can obtain status verification data from the at least one data source, compare the status verification data to a threshold, and based on the threshold, perform a further status verification.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) is preferably implemented using one or more high level procedural, or object-oriented programming languages to communicate with a computer system; however, the program(s) can be implemented in assembly or machine language, if desired. The language can be compiled or interpreted.

The processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices. The methods and systems can additionally and optionally utilize a peer-to-peer architecture.

The device(s) or computer systems that integrate with the processor(s) can include, for example, a personal computer (s), workstation (e.g., Sun, HP), personal digital assistant (PDA), handheld device such as cellular telephone, or another device capable of being integrated with a processor (s) that can operate as provided herein. Accordingly, the devices provided herein are not exhaustive and are provided for illustration and not limitation.

Although the methods and systems have been described relative to a specific embodiment thereof, they are not so limited. Obviously many modifications and variations may become apparent in light of the above teachings. In one example of a variation, an offer supplier that includes a networked processor device can be combined with at least one of an offer processor and/or a commerce processor and/or a verify processor.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A method for verifying a user's status in relation to an educational institution, the method comprising:
   receiving user information identifying the user and the educational institution, and,
   based on the user information, querying at least one networked data source to associate the user information with at least one matriculation status for the educational institution,
   wherein querying at least one networked data source includes,
   querying at least one first networked data source to determine whether the user information is associated with the at least one matriculation status,
   based on the query of the at least one first networked data source, comparing the association of the user information and the at least one matriculation status to a temporal threshold, and,
   based on the comparison, querying at least one distinct second networked data source.

2. The method of claim 1, wherein the threshold is a length of time for which the matriculation status is considered to be valid for the user.

3. The method of claim 1, wherein the threshold is an end date prior to which the matriculation status is considered to be valid for the user.

4. A method for verifying a user's status in relation to an educational institution, the method comprising:
   receiving user information identifying the user and the educational institution, and,
   based on the user information, querying at least one networked data source to associate the user information with at least one matriculation status for the educational institution
   wherein querying at least one networked data source includes,
   querying at least one first networked data source to determine whether the user information is associated with the at least one matriculation status,
   based on the query of the at least one first networked data source, comparing the association of the user information and the at least one matriculation status to a temporal threshold, and,
   based on the comparison, determining that a further query is unnecessary.

5. A method according to claim 4, where the at least one networked data source includes at least one data source accessible by at least one of an internet, an intranet, a local area network (LAN), and a wide area network (WAN).

6. A method according to claim 4, where receiving user information includes receiving at least one of a name, a user name, a social security number, a personal identification number, a student identification number, a password, a year of graduation, a telephone number, a student loan number, an email address, a mailing address, a dormitory name, and a degree identifier.

7. A method according to claim 4, where the at least one data source includes at least one data source associated wit the educational institution.

8. A method according to claim 4, where the at least one data source includes at least one of an online student directory, an online student listing, a student database, a financial database, a credit database, a government database, a marketing database, and an email database.

9. A method according to claim 4, wherein querying the at least one networked data source can include at least one of a hyper-text transfer protocol (HTTP) request, a Structured Query Language (SQL) query, a telnet command, a Java Remote Method Invocation (RMI), and an eXtensible Markup Language (XML) Remote Procedure Call (RPC).

10. A method according to claim 4, where receiving user information includes receiving user information from at least one of a processor network, a telephone network, a postal service, and hand delivery.

11. A method according to claim 4, further including storing at least the user information and the associated at least one matriculation status.

12. A method according to claim 4, further including receiving at least one off-line data that includes at least one of data from a document examination, a student enrollment catalog, a student list, and a student identification card.

13. The method of claim 4, wherein the threshold is a length of time for which the matriculation status is considered to be valid for the user.

14. The method of claim 4, wherein the threshold is an end date prior to which the matriculation status is considered to be valid for the user.

15. The method of claim 4, further including receiving at least one data from a telephone conversation.

16. A method for verifying a user's status in relation to an educational institution, the method comprising:
receiving user information identifying the user and the educational institution, and,
based on the user information, querying at least one networked data source to associate the user information with at least one matriculation status for the educational institution further including,
obtaining status verification data from the at least one networked data source, comparing the status verification data to a temporal threshold, and,
based on the threshold, performing a further status verification.

17. The method of claim 16, wherein the threshold is a length of time for which the matriculation status is considered to be valid for the user.

18. The method of claim 16, wherein the threshold is an end date prior to which the matriculation status is considered to be valid for the user.

19. A method for verifying a user as a member of an affinity group, the method comprising:
receiving user information identifying a user identity and at least one affinity group, and,
based on the user information, querying at least one networked data source to associate the user information with at least one matriculation status for the at least one affinity group,
wherein querying at least one networked data source includes,
querying at least one first networked data source to determine whether the user information is associated with the at least one matriculation status,
based on the query of the at least one first networked data source, comparing the association of the user information and the at least one matriculation status to a temporal threshold, and,
based on the comparison, determining that a further query is unnecessary.

20. A method according to claim 19, wherein receiving user information includes receiving data from a processor controlled device.

21. A method according to claim 19, wherein receiving user information includes receiving at least one of a name, a user name, a social security number, a group identification number, a personal identification number, a member number, a password, a telephone number, a loan number, an email address, a mailing address, a certificate number, and an employee number.

22. A meted according to claim 19, wherein the at least one networked data source includes at least one networked database and at least one directory listing.

23. The method of claim 19, wherein the threshold is a length of time for which the affinity group membership status is considered to be valid for the user.

24. The method of claim 19, wherein the threshold is an end date prior to which the affinity group membership status is considered to be valid for the user.

25. A method for verifying a user as a member of an affinity group, the method comprising:
receiving user information identifying a user identity and at least one affinity group, and,
based on the user information, querying at least one networked data source to associate the user information with at least one matriculation status for the at least one affinity group,
wherein querying at least one networked data source includes,
querying at least one first networked data source to determine whether the user information is associated with the at least one matriculation status,
based on the query of the at least one first networked data source, comparing the association of the user information and the at least one matriculation status to a temporal threshold, and,
based on the comparison, querying at least one distinct second networked data source.

26. The method of claim 25, wherein the threshold is a length of time for which the affinity group membership status is considered to be valid for the user.

27. The method of claim 25, wherein the threshold is an end date prior to which the affinity group membership status is considered to be valid for the user.

28. A method for verifying a user as a member of an affinity group, the method comprising:
receiving user information identifying a user identity and at least one affinity group, and,
based on the user information, querying at least one networked data source to associate he user information with at least one matriculation status for the at least one affinity group,
wherein querying at least one networked data source includes,
obtaining status verification data from the at least one networked data source,
comparing the status verification data to a temporal threshold, and,
based on the threshold, performing a further status verification.

29. The method of claim 28, wherein the threshold is a length of time for which the affinity group membership status is considered to be valid for the user.

30. The method of claim 28, wherein the threshold is an end date prior to which the affinity group membership status is considered to be valid for the user.

* * * * *